United States Patent
Hania et al.

(10) Patent No.: US 10,942,746 B2
(45) Date of Patent: Mar. 9, 2021

(54) SYSTEM AND METHOD FOR HIGH THROUGHPUT IN MULTIPLE COMPUTATIONS

(71) Applicant: RAIL VISION LTD, Ra'anana (IL)

(72) Inventors: Shahar Hania, Kedumim (IL); Hanan Zeltzer, Hod Hasharon (IL)

(73) Assignee: RAIL VISION LTD, Ra'anana (IL)

( * ) Notice: Subject to any disclaimer, the term of this patent is extended or adjusted under 35 U.S.C. 154(b) by 0 days.

(21) Appl. No.: 16/642,026

(22) PCT Filed: Aug. 30, 2018

(86) PCT No.: PCT/IL2018/050965
§ 371 (c)(1),
(2) Date: Feb. 26, 2020

(87) PCT Pub. No.: WO2019/043710
PCT Pub. Date: Mar. 7, 2019

(65) Prior Publication Data
US 2020/0183698 A1    Jun. 11, 2020

Related U.S. Application Data

(60) Provisional application No. 62/552,475, filed on Aug. 31, 2017.

(51) Int. Cl.
*G06T 1/20*    (2006.01)
*G06T 1/60*    (2006.01)
(Continued)

(52) U.S. Cl.
CPC ............ *G06F 9/3851* (2013.01); *G06F 8/441* (2013.01); *G06T 1/20* (2013.01); *G06T 1/60* (2013.01);
(Continued)

(58) Field of Classification Search
CPC ... G06T 1/20; G06T 1/60; G06F 8/441; G06F 9/3851
(Continued)

(56) References Cited

U.S. PATENT DOCUMENTS

2012/0320070 A1    12/2012  Arvo
2013/0111055 A1*    5/2013  Chang .................. H04L 43/026
                                                                    709/231
(Continued)

FOREIGN PATENT DOCUMENTS

EP          2795472        10/2014
WO    WO 2006117683        5/2009

OTHER PUBLICATIONS

International Search Report for Application No. PCT/IL2018/050965 dated Dec. 11, 2018.

*Primary Examiner* — Jacinta M Crawford
(74) *Attorney, Agent, or Firm* — Pearl Cohen Zedek Latzer Baratz LLP

(57) ABSTRACT

Device, circuit and method are configured to enhance throughout of processing of vast amount of data such as video stream. In some embodiment frequently used data blocks are stored in a fast RAM of the processor. In another embodiment received stream of data is divided to plurality of data portions and is streamed concurrently to streaming multiprocessors of a graphic processing unit (GPU) and is processed concurrently before the entire stream is loaded.

6 Claims, 4 Drawing Sheets

(51) Int. Cl.
  *G06F 9/38* (2018.01)
  *G06F 8/41* (2018.01)
  *G06F 12/0806* (2016.01)
  *G06F 13/30* (2006.01)
  *G06F 13/40* (2006.01)

(52) U.S. Cl.
  CPC .......... *G06F 12/0806* (2013.01); *G06F 13/30* (2013.01); *G06F 13/4022* (2013.01); *G06F 2212/621* (2013.01)

(58) Field of Classification Search
  USPC ................ 345/501, 503, 537, 543, 558, 559
  See application file for complete search history.

(56) References Cited

U.S. PATENT DOCUMENTS

| | | | |
|---|---|---|---|
| 2014/0244703 A1* | 8/2014 | Luitjens | G06F 8/445 708/490 |
| 2014/0282580 A1* | 9/2014 | Zeng | G06F 12/10 718/104 |
| 2014/0368524 A1 | 12/2014 | Srinivasan et al. | |

\* cited by examiner

SYSTEM AND METHOD FOR HIGH THROUGHPUT IN MULTIPLE COMPUTATIONS

CROSS-REFERENCE TO RELATED APPLICATIONS

This application is a National Phase Application of PCT International Application No. PCT/IL2018/050965, International Filing Date Aug. 30, 2018, published as WO 2019/043710 on Mar. 7, 2019 and entitled System and Method for High Throughput in Multiple Computations, claiming the benefit of U.S. Provisional Patent Application No. 62/552,475, filed Aug. 31, 2017 which is hereby incorporated by reference.

BACKGROUND OF THE INVENTION

Computing systems that are adapted to handle/process vast amounts of graphical data and computations typically comprise, aside a central processing unit (CPU), multiple processing unit (MPU) such as GPU, GPGPU, DSP, SIMD based processing unit, VLIW based processing unit adapted and designated for handling and processing the required data. Such computing systems' structure is well known in the art. This structure typically splits the computing tasks between the CPU and MPU so that the heavy computations are assigned to MPU, leaving the rest of the computations tasks for the CPU to handle.

However, this well-known structure suffers of low efficiency where large amounts of graphical data is involved, due to the large amounts of handling resources required for managing the transfer of the graphical data between the CPU and the MPU, back-and-forth. In some cases, the net time usable for data computations in a CPU-MPU computing structure may be as low as 5% or less. For example, a Nvidia® Compute Unified Device Architecture (CUDA) parallel computing platform and application programming interface model typical time portions spent for graphical data handling may be 49% for transferring the graphical data from the CPU environment to the GPU environment (e.g. to CUDA memory), 47% for transferring the graphical data from the GPU environment back to the CPU environment (CUDA memory) and no more than 4% for graphical computations. Such very low graphical computation efficiency stems from the common architectures defining the way graphical data is transferred between the processors.

There is a need to enable substantial raise of the MPU efficiency, that is substantial raise of the time portion assigned to graphical calculations.

SUMMARY OF THE INVENTION

A method for enhancing graphical data throughput exchanged between graphical data source and a graphical processing unit (GPU) via a streaming multiprocessor unit is disclosed. The GPU may comprise a processing core unit (PCU), a register file unit, multiple cache units, shared memory unit, unified cache unit and interface cache unit. The method may comprise transferring stream of graphical data via interface cache unit and via the multiple cache units and via the unified cache unit to the register file unit, transferring a second stream of graphical data from the register file unit to the processing core unit, and storing and receiving frequently used portions of data in shared memory unit, via register file unit.

In some embodiments the register file unit is configured to direct data processed by the PCU to the shared memory unit as long as it is capable of receiving more data, based on the level of frequent use of that data.

In some embodiments the level of frequent use is determined by the PCU.

A streaming multiprocessor unit for enhancing throughput of processing of data is disclosed comprising a processing core unit (PCU) configured to process graphical data, a register file unit configured to provide graphical data from the PCU and to receive and temporary store processed graphical data from the PCU, multiple cache units, configured to provide graphical data from the register file unit and to receive and temporary store processed graphical data from the register file unit, shared memory unit configured to provide graphical data from the register file unit and to receive and temporary store processed graphical data from the register file unit, unified cache unit configured to provide graphical data from the register file unit and to receive and temporary store processed graphical data from the register file unit, and interface cache unit, configured to receive graphical data for graphical processing at high pace, to provide the graphical data to at least one of shared memory unit and unified cache unit, to receive processed graphical data from the unified cache unit, and to provide the processed graphical data to external processing units.

In some embodiments at least some of the graphical data elements are stored, before and/or after processing by the PCU in the shared memory unit, based on a priority figure that is associated with the probability of their close call by the PCU.

In some embodiments the priority figure is higher as the probability is higher.

A circuit for handling unprocessed data is disclosed comprising a data stream divider unit (DSDU) and a graphics processing unit (GPU). The DSDU comprising an array comprising plurality of first-in-first-out (FIFO) registers, configured to receive a stream of data and to divide it into portions of data and to pass each of the portions of data through one of the plurality of FIFO registers and a first advanced extensible interface (AXI) unit configured to receive the data portions. The GPU comprising a second advanced extensible interface (AXI) unit configured to receive data portions from the first AXI unit and a plurality of streaming multiprocessors (SM) configured to receive each data portion from a respective FIFO register, and to process the received data portion.

In some embodiments a specific FIFO register in the DSDU is connected to an assigned SM in the GPU via an assigned first AXI unit in the DSDU and an assigned second AXI unit in the GPU.

In some embodiments each of the FIFO registers in the DSDU is connected to an assigned SM in the GPU via a first common AXI unit in the DSDU and a common AXI unit in the GPU.

A method for efficiently processing large amount of data is disclosed comprising receiving a stream of unprocessed data, dividing the stream to a plurality of data portions, passing each data portion via a specific FIFO register in a data stream divider unit (DSDU), and transferring the data portion from the specific FIFO register to an assigned streaming multiprocessor (SM) in graphics processor unit (GPU) for processing.

In some embodiments the data portions are transferred via a first specific advanced extensible interface (AXI) unit in the DSDU and a second specific advanced extensible interface (AXI) unit in the GPU.

In some embodiments a data portion received from a specific FIFO register is transferred to the assigned SM in the GPU via an assigned first AXI unit in the DSDU and an assigned second AXI unit in the GPU.

In some embodiments each of the data portion received from FIFO registers in the DSDU is transferred to the assigned SM in the GPU via a common first AXI unit in the DSDU and a common second AXI unit in the GPU.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The bottle-neck of CPU-GPU mutual operation in known computing systems lies, mostly, in the data transfer channels used for directing graphical related data by the CPU to the GPU and receiving the processed graphical data back from the GPU. Typically, the CPU and the GPU processors operate and communicate in standard computing environments.

Figure 1:
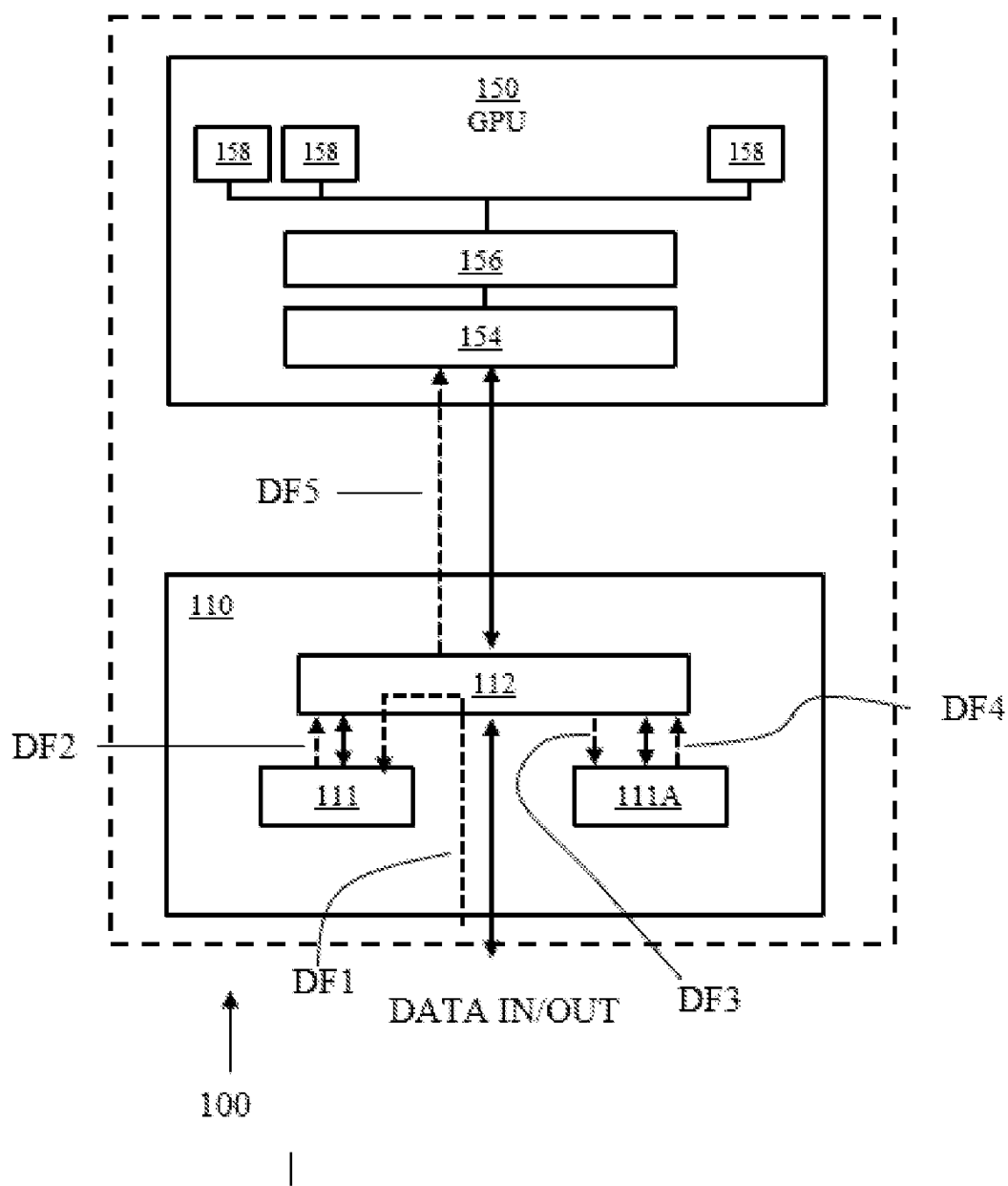
FIG. 1 schematically illustrates data flow in computing unit using a GPU.

Reference is made to FIG. 1, schematically illustrating data flow in computing unit 100 using a GPU. Computing unit 100 comprise CPU 111, CPU dynamic RAM (DRAM) 111A, and computing unit peripheral controlling unit (such as main board chipset) 112. Unit 100 further comprises GPU unit 150, communicating data with the CPU via unit 112.

GPU unit 150 typically comprises GPU DRAM unit 154, interfacing data between unit 112 and the GPU processors, GPU cache units 156 (such as L2 cache units) that is adapted to cache data for the GPU processing units, and GPU processing units 158 (such as streaming multiprocessor/SM).

The flow of graphical data that enters processing unit 100 and is intended to be processed by GPU 150 is described by data flow (DF) arrows. First Data flow—DF1 depicts the flow of data into computing unit 100, where CPU 111 directs the flow—DF2—via peripheral controlling unit (PCU) 112, to DRAM 111A and back from it—DF3—via PCU 112—DF4—to GPU 150. At GPU 150 the flow of the data passes through DRAM unit 154 and through cache units 156 to the plurality of streaming multiprocessors (SMs) units 158 where graphical processing takes place.

It is a target of methods and structures according to the present invention to eliminate as much data flow bottlenecks as possible.

Figure 2:
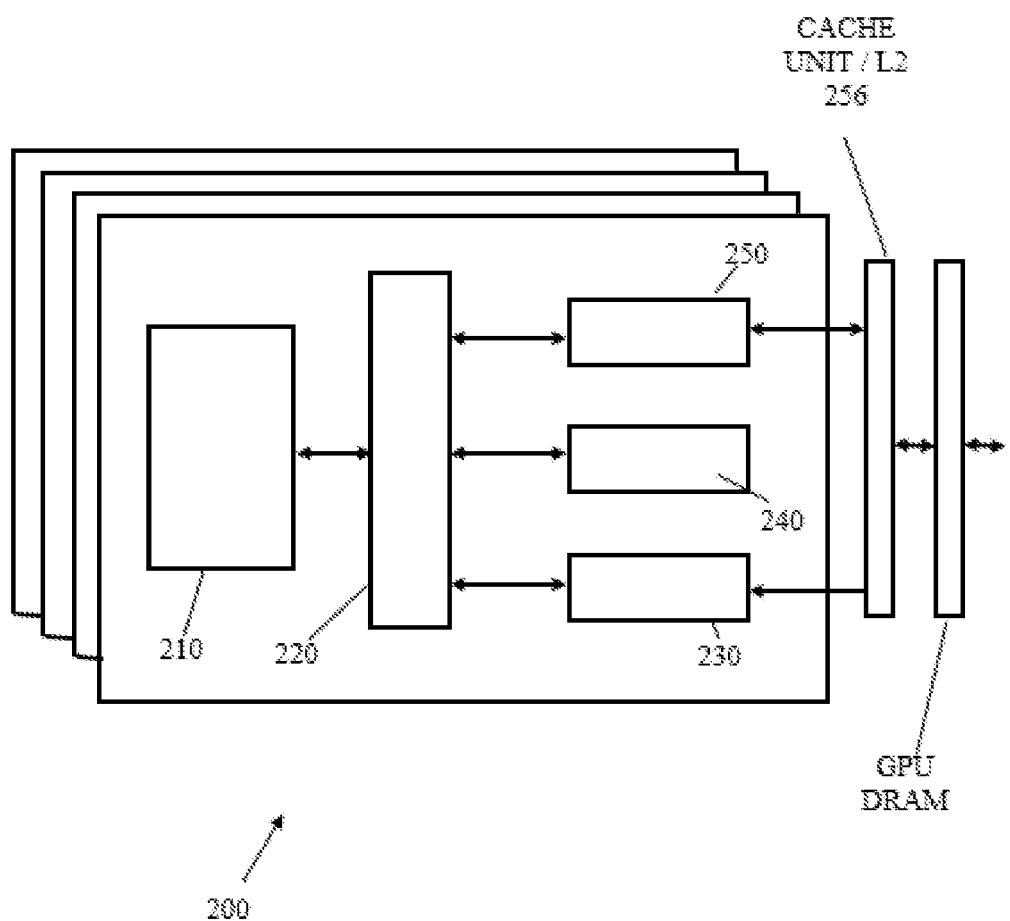
FIG. 2 is a schematic block diagram of a typical streaming multiprocessor (SM) in a GPU unit.

Reference is made now to FIG. 2, which is a schematic block diagram of a typical streaming multiprocessor (SM) 200 in a GPU unit. SM 200 may comprise processing core unit 210 (sometimes called Compute Unified Device Architecture (CUDA) core), register file 220 to mediate data between core 201 and cache units 230 (constant cache), 250 (unified cache) and with shared memory 240. Data inbound towards SM 200 and outbound from it is exchanged with the GPU cache unit 256 (such as cache units 156 (L2)) of FIG. 1. When graphical processing is carried out in known methods, the GPU unit will await until the entire amount of data to be processed is loaded onto the memory units of its several SM 200 units before graphical processing commences.

One way of reducing data transfers time is minimization of redundant data transfers. For example, intermediate results calculated by core 210 may be stored in register file 220 instead of storing them in the DRAM. Further, shared memory 240 may be used for storing data that is frequently used within SM 200, instead of circulating it outbound, as is commonly done. In some embodiments the level of frequency of use is determined by the PCU. Still further, constant memory units and/or cache memory units may be defined in SM 210.

According to further embodiments of the present invention data flow bottle-neck between the CPU computing environment and the GPU computing environment may be reduced or eliminate, by replacing the CPU with a specifically structured computing unit for all handling of graphical-related data.

Figure 3A:
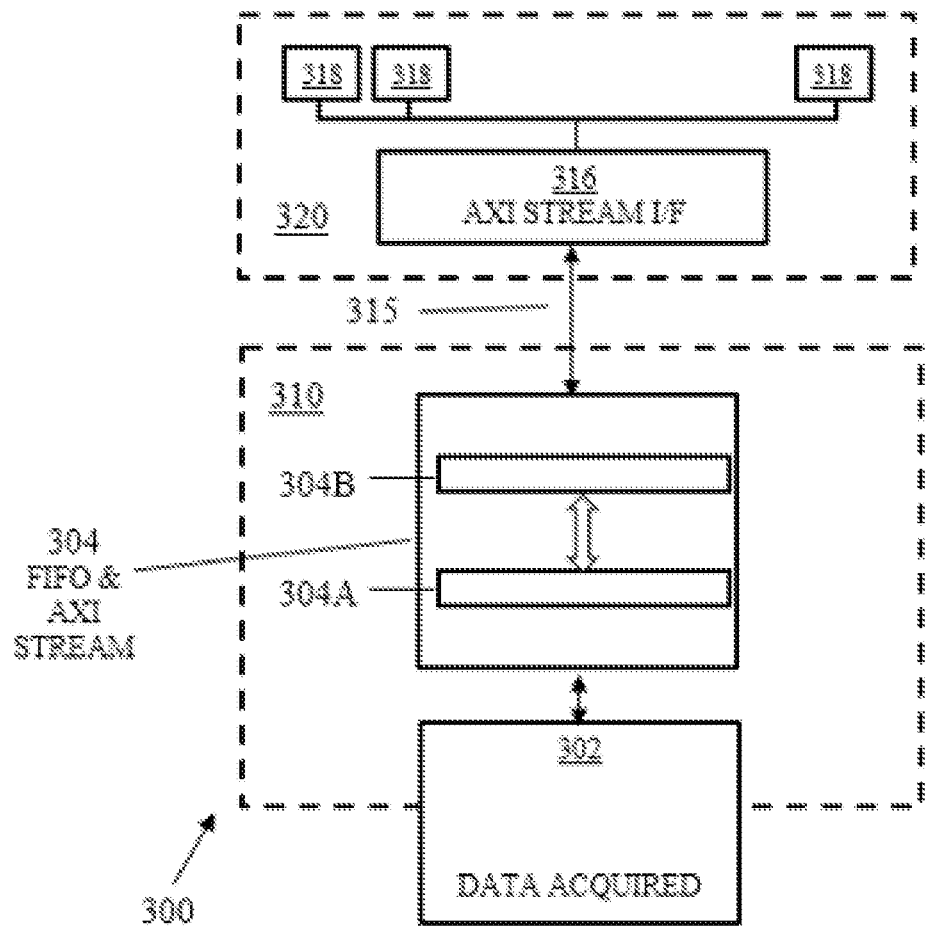
FIG. 3A is a schematic block diagram depicting an unprocessed data (UPD) handling unit (UPDHU) 300, structured and operative according to embodiments of the present invention.
Figure 3B:
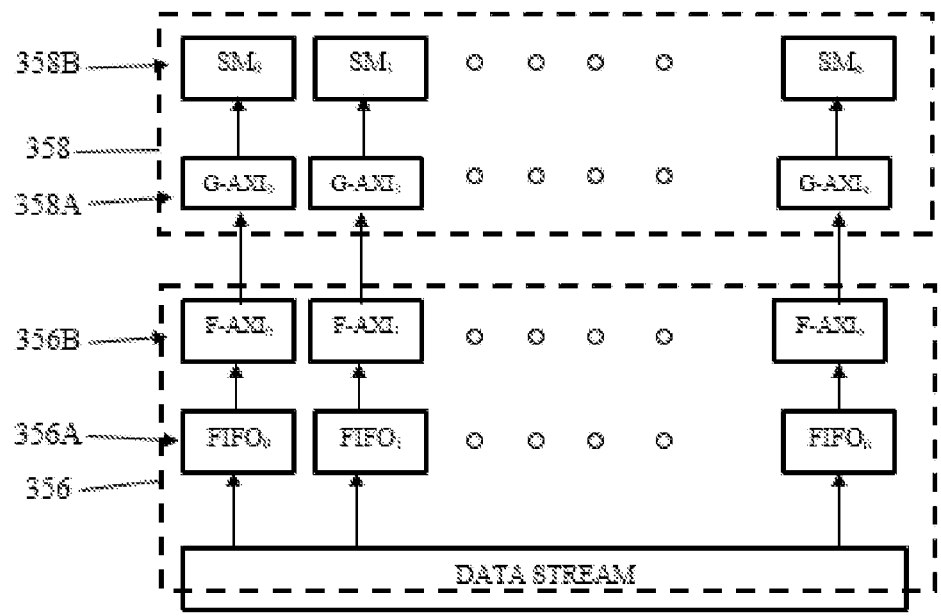
FIGS. 3B and 3C are schematic block diagrams of two different embodiments, of UPDHU, such UPDHU 300 of FIG. 3A It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.
Figure 3C:
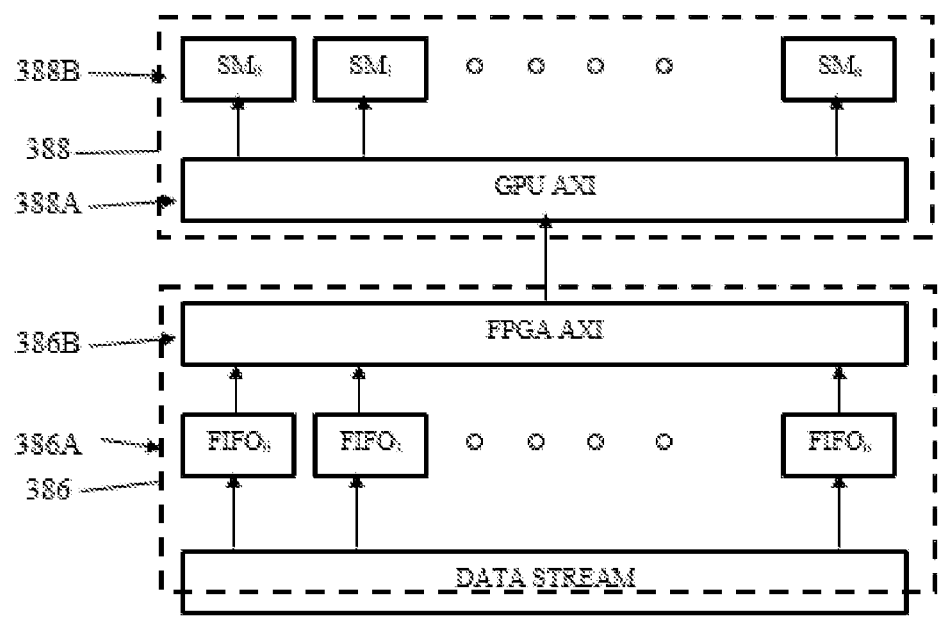

Reference is made now to FIG. 3A, which is a schematic block diagram depicting an unprocessed data (UPD) handling unit (UPDHU) 300, structured and operative according to embodiments of the present invention, and to FIGS. 3B and 3C, which are schematic block diagrams of two different embodiments, 350 and 380, of UPDHU, such UPDHU 300 of FIG. 3A. The term 'unprocessed data' as used herein after relates to large stream of data that is about to be processed, and that typically requires large computation capacity, such as fast stream of graphical data (e.g. received from 4K video camera) that needs to be processed in virtually "real time" (i.e. with as small as possible latency). The architecture of UPDHU 300 depicted in FIG. 3A is designed to overcome the inherent bottle neck of data stream flow typical to CPU-GPU known architectures, where incoming stream of data acquisition is first handled by a the CPU, then being temporarily stored in the CPU memory and/or RAM associated with the CPU, then it is transferred, again as data stream (e.g. over Peripheral Component Interconnect Express (PCIe) bus), to the GPU and again being handled by the GPU processor before it is sent to the multiple streaming processors being part of the GPU. The example described herein with regard to FIG. 3A demonstrates use of field programmable gate array (FPGA) programmed to operate according to the advanced extensible interface (AXI), however it would be apparent to those skilled in the art that the method of operation described herein may be embodied using other computing units that are adapted to interface with a respective GPU and to transfer large amount of graphical—related data in high throughput. According to embodiments of the invention data stream divider unit (DSDU) 304 may be embodied by, for example, using FPGA that is programmed to receive large amount of streamed UPD, e.g. video stream from a camera, to distribute it into plurality of smaller streams and to transfer the streams to SMs of a GPU. The FPGA and the GPU may further be programmed to operate so that the GPU begins processing of the graphical data transferred to it as soon as at least one SM of the plurality of the SMs of the GPU is fully loaded. In most cases the fully loaded SMs hold amount of data that is smaller than the full data file, therefore the processing by the GPU will begin, according to this embodiment, much earlier compared to commonly known embodiments where the processing begins after the entire data file was loaded to the GPU.

In an exemplary embodiment UPDHU 300 comprises a Multi Streamer unit (MSU) 310 that may comprise a DSDU 304 comprising plurality of first-in-first-out (FIFO) registers/storage units array 304A (the FIFO units are not shown separately), of which one FIFO unit may be assigned to each of the SMs 318 of GPU 320. In some embodiments the received UPD stream that is received by DSDU 304 may be partitioned to multiple data units, which may be transferred to GPU 320 via FIFO units 304A, broadcasted to the GPU over an interface unit, such as AXI interface, such that data unit in each FIFO 304A is transferred to the associated SM 318, thereby enabling, for example, single action multiple data (SIMD) computing. When each (even a single) SM 318 of GPU 320 is loaded with the respective portion of the unprocessed data received from the associated FIFO 304A unit over an AXI interface, GPU 320 may start processing, not having to wait until the entire UPD file is loaded.

MSU 310 may comprise unprocessed data interface unit 302, configured to receive long streams of graphical data. The large amount of unprocessed data received via interface unit 302 may be partitioned to smaller size, plurality number of data units, to be transferred each via an assigned FIFO unit in FIFO unit 304A and then, over an AXI channel 315, via GPU AXI interface 316 to the assigned SM 318 of GPU 320.

Data units that were processed by the respective SM of SMs 318 may then be transferred back, over AXI connection, to the MSU. As seen, large overhead that is typical to CPU-GPU architectures is saved in the embodiments described above.

FIGS. 3B and 3C depict schematic block diagrams of two optional architectures embodying MSU 310 of FIG. 3A, according to embodiments of the present invention. FIG. 3B depicts MSU 350 comprises FIU 356 and GPU 358. FIU 356 may comprise plurality of FIFO units (collectively named 356A)—$FIFO_0$, $FIFO_1$ . . . $FIFO_n$. each FIFO unit may be in active communication with an assigned FPGA AXI (F-AXI) unit—$F-AXI_0$, $F-AXI_1$ . . . $F-AXI_n$ (collectively named 356B). Each of the separate F-AXI units may be in direct connection with an assigned GPU AXI (G-AXI) unit—$G-AXI_0$, $G-AXI_1$ . . . $G-AXI_n$. each of the G-AXI interface units may be in active connection with, and may provide data to an assigned SM—$SM_0$, $SM_1$ . . . $SM_n$. According to yet another embodiment, as depicted in FIG. 3C, MSU 380 comprises FIU 386 and GPU 388. FIU 386 may comprise plurality of FIFO units (collectively named 386A)—$FIFO_0$, $FIFO_1$ . . . $FIFO_n$. each FIFO unit may be in active communication with a FPGA AXI (F-AXI) unit that may be configured to control administer the data streams from the plurality of FIFO units into a single AXI stream. The AXI stream may be transmitted to an AXI interface unit 388A of GPU 388 and may then be divided to the respective SMs units—$SM_0$, $SM_1$ . . . $SM_n$. The architecture depicted in FIG. 3B may provide a faster overall performance but may require larger number of pins (for an integrated circuit (IC) embodying the described circuit) and a larger number of wires/conduits. The architecture depicted in FIG. 3C may provide a relatively slower overall performance but may require smaller number of pins (for an integrated circuit (IC) embodying the described circuit) and a smaller number of wires/conduits.

The above described devices, structures and methods may accelerate the processing of large amount of unprocessed data, compared to known architectures and methods. For example, in known embodiments there is the need to transfer the whole image before the process/algorithm could start on the GPU. If the image size is 1 GB, the theoretical throughput of the PCI-E bus transferring data to the GPU is 32 GB/s, so latency would be 1 GB/(32 GB/s)=1/32 s=31.125 ms≈31.3 ms. in contrary, with the FPGA according to embodiment of the invention it is just needed to fully load all SM units. For example, in the Tesla P100 GPU there are 56 SM units, and in each SM there are 64 cores that support 32 bit (in single precision mode) or 32 cores that support 64 bit (extended precision mode), thus the data size for a fully loaded GPU (same result for single or extended precision modes) is 56*32*64=114688 bits=14.336 Mbytes. The FPGA to GPU AXI stream theoretical throughput is 896 MB/s (for 56 lanes), so latency is 14.336 MB/(896 MB/s)=14.336/896 s=16 ms, which is substantially half the latency.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A circuit for handling unprocessed data comprising:
  a data stream divider unit (DSDU) (304), comprising:
    an array comprising plurality of first-in-first-out (FIFO) registers, configured to receive a stream of data and to divide it into portions of data and to pass each of the portions of data through one of the plurality of FIFO registers; and
    a first advanced extensible interface (AXI) unit configured to receive the data portions; and
  a graphics processing unit (GPU) comprising:
    a second advanced extensible interface (AXI) unit configured to receive data portions from the first AXI unit; and
    a plurality of streaming multiprocessors (SM) configured to receive each data portion from a respective FIFO register, and to process the received data portion.

2. The circuit of claim 1, wherein a FIFO register in the DSDU is connected to an assigned SM in the GPU via an assigned first AXI unit in the DSDU and an assigned second AXI unit in the GPU.

3. The circuit of claim 1, wherein each of the FIFO registers in the DSDU is connected to an assigned SM in the GPU via a first common AXI unit in the DSDU and a common AXI unit in the GPU.

4. A method for efficiently processing large amount of data comprising:
- receiving a stream of unprocessed data;
- dividing the stream to a plurality of data portions;
- passing each data portion via a specific FIFO register in a data stream divider unit (DSDU); and
- transferring the data portion from the specific FIFO register to an assigned streaming multiprocessor (SM) in graphics processor unit (GPU) for processing,
- wherein the data portions are transferred via a first advanced extensible interface (AXI) unit in the DSDU and a second advanced extensible interface (AXI) unit in the GPU.

5. The method of claim 4, wherein a data portion received from a specific FIFO register is transferred to the assigned SM in the GPU via an assigned first AXI unit in the DSDU and an assigned second AXI unit in the GPU.

6. The method of claim 4, wherein each of the data portion received from FIFO registers is transferred to the assigned SM in the GPU via a common first AXI unit in the DSDU and a common second AXI unit in the GPU.

\* \* \* \* \*